US012766567B2

(12) United States Patent
Hong et al.

(10) Patent No.: US 12,766,567 B2
(45) Date of Patent: Oct. 20, 2026

(54) FOREIGN MATTER REMOVAL DEVICE

(71) Applicant: LG Energy Solution, Ltd., Seoul (KR)

(72) Inventors: Sang Jin Hong, Daejeon (KR); Yu Sang Jeong, Daejeon (KR); Guktae Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 307 days.

(21) Appl. No.: 18/284,629

(22) PCT Filed: Sep. 2, 2022

(86) PCT No.: PCT/KR2022/013234
§ 371 (c)(1),
(2) Date: Sep. 28, 2023

(87) PCT Pub. No.: WO2023/033612
PCT Pub. Date: Mar. 9, 2023

(65) Prior Publication Data
US 2024/0181502 A1 Jun. 6, 2024

(30) Foreign Application Priority Data
Sep. 3, 2021 (KR) ........................ 10-2021-0117897
Sep. 2, 2022 (KR) ........................ 10-2022-0111454

(51) Int. Cl.
*B08B 5/02* (2006.01)
*B08B 5/04* (2006.01)

(52) U.S. Cl.
CPC . *B08B 5/02* (2013.01); *B08B 5/04* (2013.01)

(58) Field of Classification Search
CPC ... H01M 4/02; B08B 1/02; B08B 5/02; H01L 21/304
See application file for complete search history.

(56) References Cited

U.S. PATENT DOCUMENTS 4,761,943 A * 8/1988 Parker .................. A01D 43/077 56/202
4,998,877 A * 3/1991 Schilling ................ F23D 11/36 431/114

(Continued)

FOREIGN PATENT DOCUMENTS

CN 108273804 A 7/2018
CN 109127584 A 1/2019

(Continued)

OTHER PUBLICATIONS

Search Report dated Jun. 23, 2025 from the Office Action for Chinese Application No. 202280029130.0 issued Jun. 25, 2025, pp. 1-2.

(Continued)

*Primary Examiner* — Michael D Jennings
(74) *Attorney, Agent, or Firm* — Lerner David LLP

(57) ABSTRACT

A foreign matter removal device according to an embodiment of the present disclosure removes foreign matters on the surface of an electrode that is continuously transferred along one direction, and includes a blowing unit that blows air toward the electrode surface, a suction unit that sucks foreign matters separated from the electrode surface, and an extension unit extending between the blowing unit and the suction unit, wherein the extension unit is formed with an adjustment unit recessed in a direction away from the electrode surface.

11 Claims, 8 Drawing Sheets

(56) References Cited

U.S. PATENT DOCUMENTS

| | | | | |
|---|---|---|---|---|
| 5,800,679 | A * | 9/1998 | Lindstrom | B08B 5/046 15/345 |
| 5,845,477 | A * | 12/1998 | Stahlecker | D01H 4/32 57/411 |
| 5,916,373 | A | 6/1999 | Schneider | |
| 6,061,996 | A * | 5/2000 | Vissers | B65G 47/647 53/247 |
| 6,148,831 | A * | 11/2000 | Lindstrom | D21G 3/00 15/345 |
| 2001/0009050 | A1* | 7/2001 | Fukushima | A47L 5/14 15/377 |
| 2002/0059689 | A1* | 5/2002 | Kato | A47L 9/08 15/412 |
| 2008/0271280 | A1* | 11/2008 | Tiede | A47L 9/0036 15/412 |
| 2016/0330905 | A1* | 11/2016 | Horstmann | A01D 34/82 |
| 2017/0002515 | A1* | 1/2017 | Saikkonen | D21F 5/181 |

FOREIGN PATENT DOCUMENTS

| | | | |
|---|---|---|---|
| DE | 10211309 | A1 | 9/2003 |
| EP | 0789635 | B1 | 8/1999 |
| EP | 0937178 | B1 | 4/2002 |
| EP | 1344578 | A2 | 9/2003 |
| JP | H05138136 | A | 6/1993 |
| JP | H10277628 | A | 10/1998 |
| JP | 2004195399 | A | 7/2004 |
| JP | 2009072651 | A | 4/2009 |
| JP | 2020042960 | A | 3/2020 |
| KR | 20010038334 | A | 5/2001 |
| KR | 20080005630 | A | 1/2008 |
| KR | 20080017768 | A | 2/2008 |
| KR | 101025325 | B1 | 3/2011 |
| KR | 20170044955 | A | 4/2017 |
| KR | 20200048987 | A | 5/2020 |
| KR | 20210063711 | A | 6/2021 |
| WO | WO9607490 | A1 | 3/1996 |
| WO | 9819009 | A1 | 5/1998 |
| WO | 2007007407 | A1 | 1/2007 |

OTHER PUBLICATIONS

International Search Report for PCT/KR2022/013234 mailed Dec. 2, 2022. 3 pages.

Extended European Search Report including Written Opinion for Application No. 22865114.7 dated Sep. 5, 2024, pp. 1-9.

* cited by examiner

【FIG. 1】
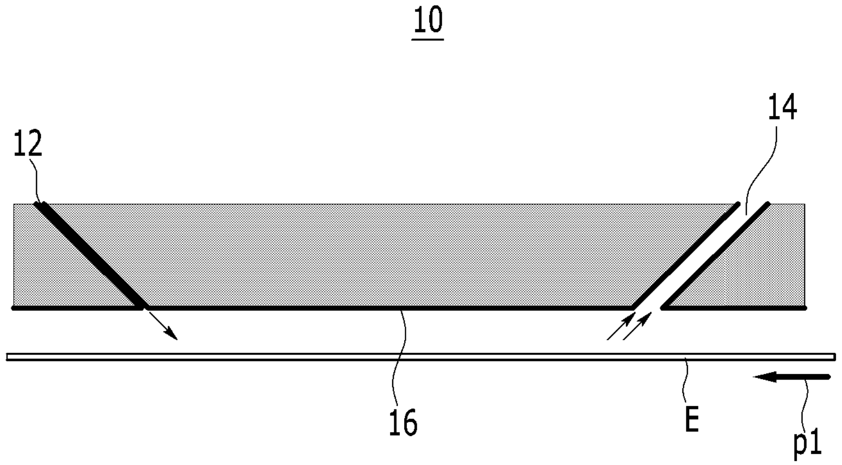
【FIG. 2】
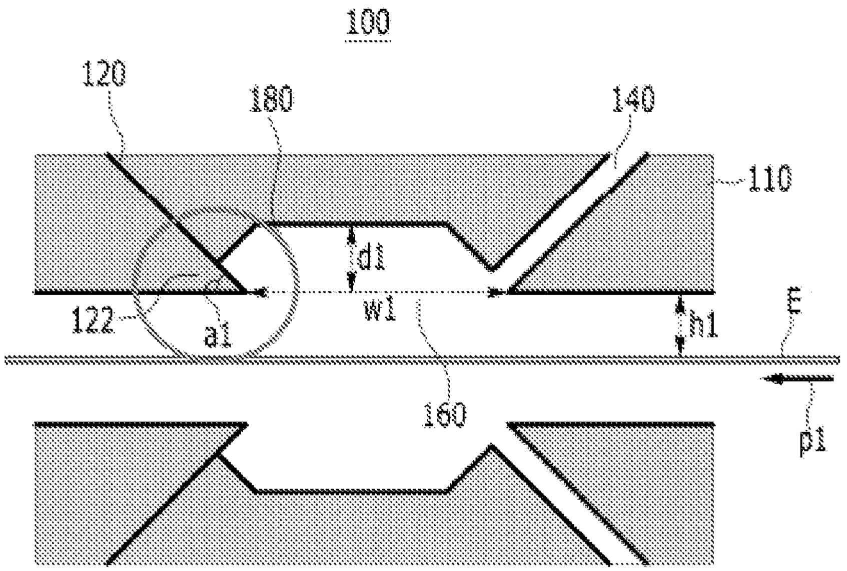

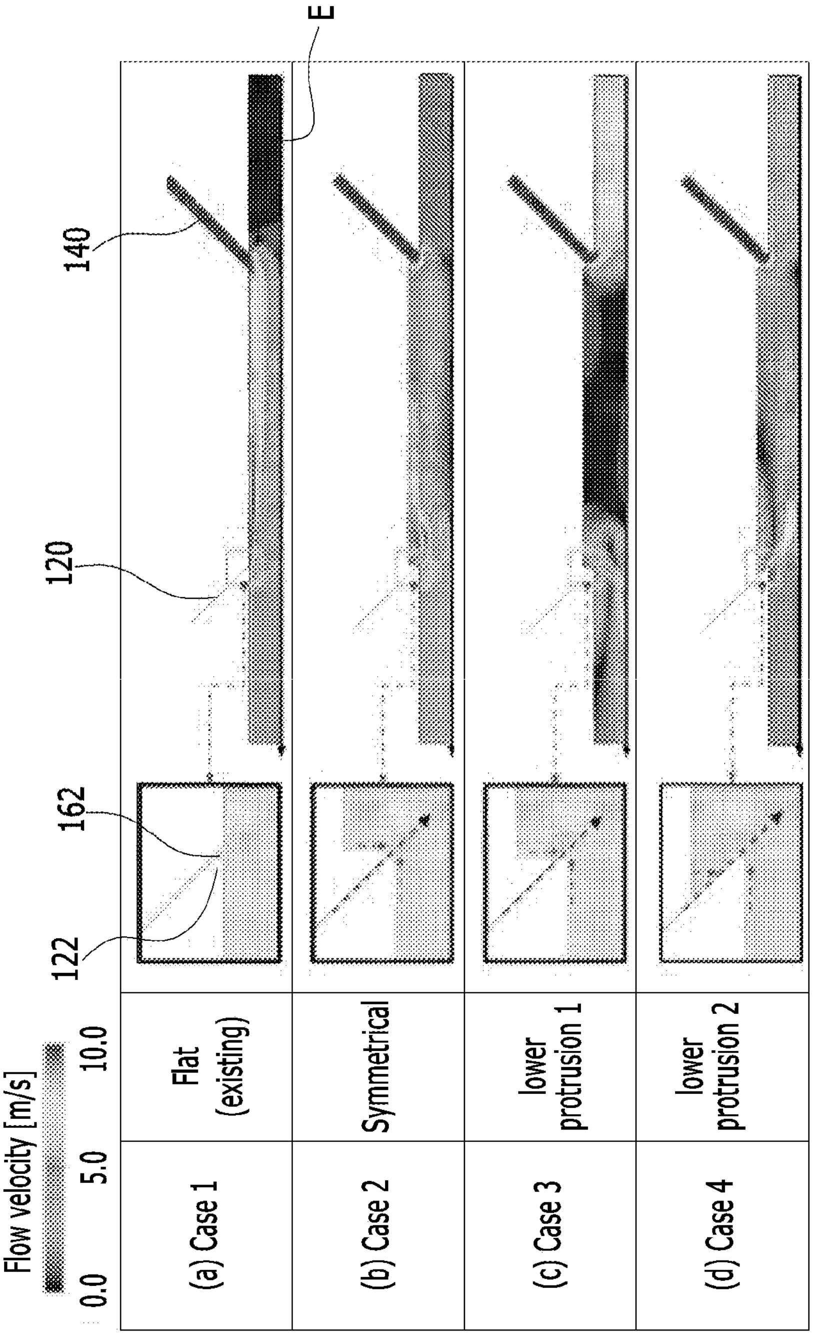
【FIG. 3】

| Case No. | input | | | output | | | | |
|---|---|---|---|---|---|---|---|---|
| | a1(deg) | d1(mm) | w1(mm) | Electrode surface flow velocity (m/s) | WSS(Pa) | Left outflow (m/s) | Suction flow velocity (m/s) | Outflow generated |
| 1 | 35 | 3 | 20 | 9.99 | 1.03 | 3.51 | -12.00 | - |
| 2 | 35 | 5 | 35 | 12.64 | 2.41 | 1.25 | -6.00 | - |
| 3 | 35 | 10 | 50 | 14.08 | 3.25 | -0.71 | -15.00 | Outflow generated |
| 4 | 45 | 3 | 35 | 14.67 | 3.17 | 0.56 | -4.00 | - |
| 5 | 45 | 5 | 50 | 15.28 | 3.67 | -0.75 | -15.00 | Outflow generated |
| 6 | 45 | 10 | 20 | 15.98 | 2.65 | 3.13 | -11.00 | - |
| 7 | 55 | 3 | 50 | 15.23 | 3.74 | -0.96 | -15.00 | Outflow generated |
| 8 | 55 | 5 | 20 | 16.06 | 3.01 | 2.17 | -8.00 | - |
| 9 | 55 | 10 | 35 | 12.89 | 3.45 | -2.24 | -15.00 | Outflow generated |

【FIG. 4】

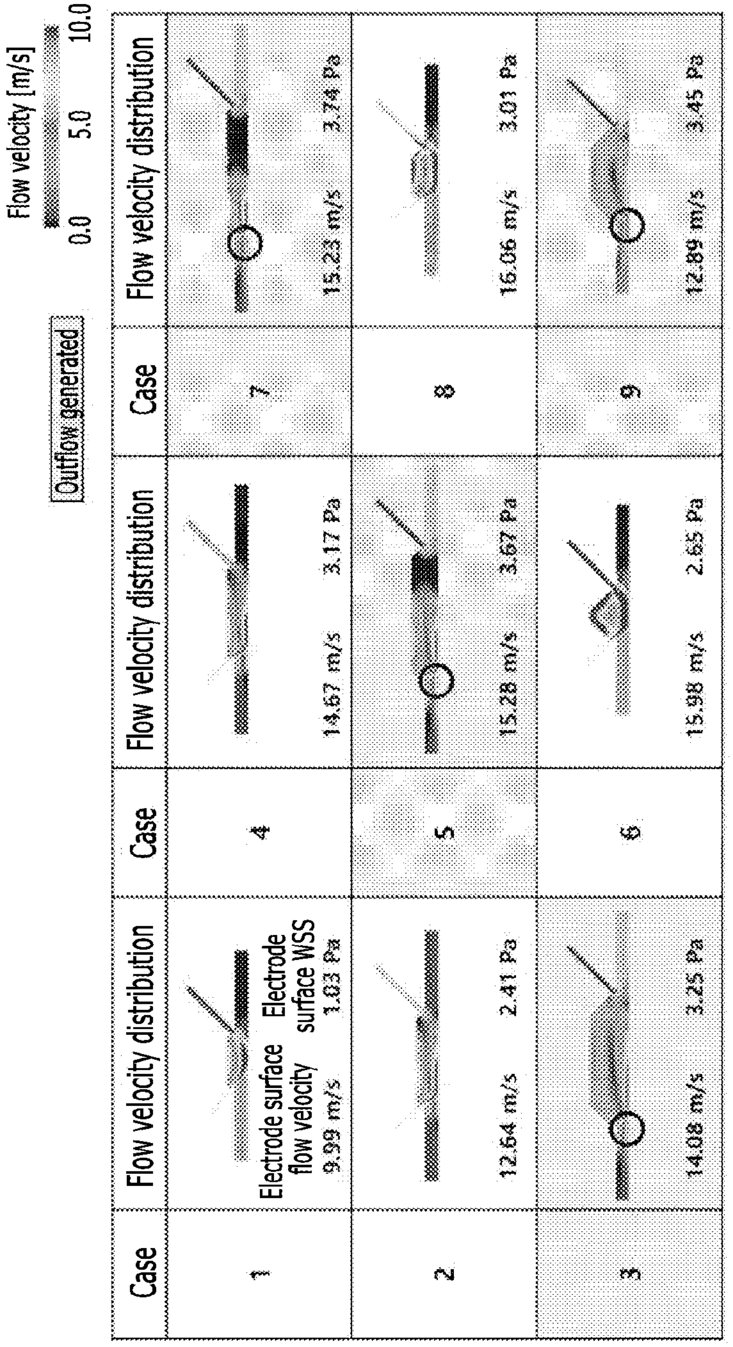
【FIG. 5】

【FIG. 6】
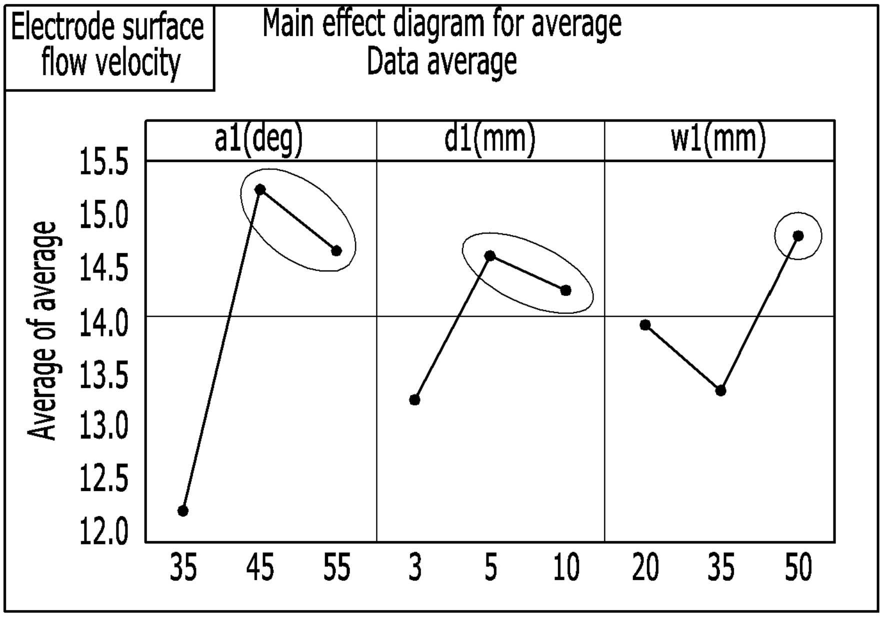
【FIG. 7】
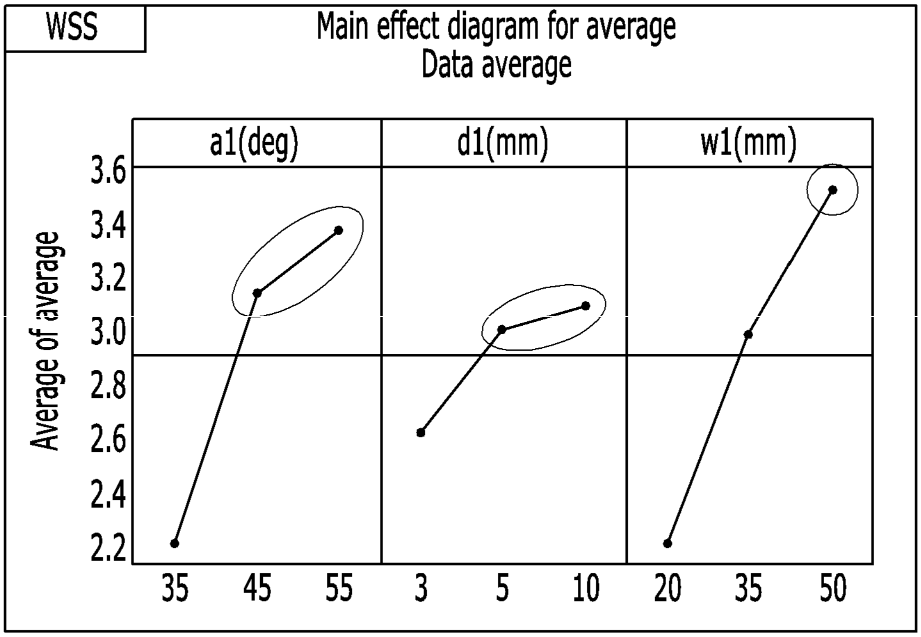

【FIG. 8】
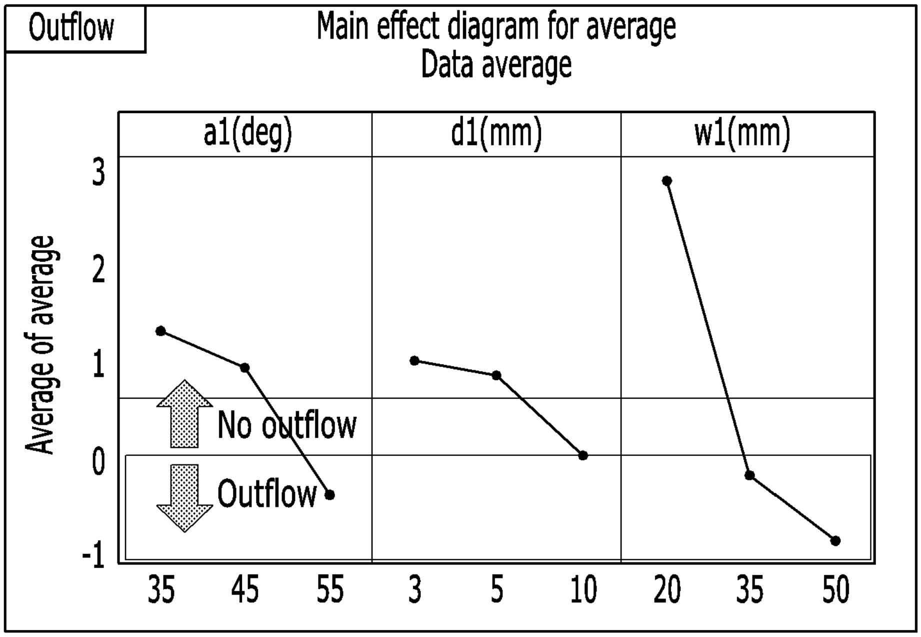
【FIG. 9】
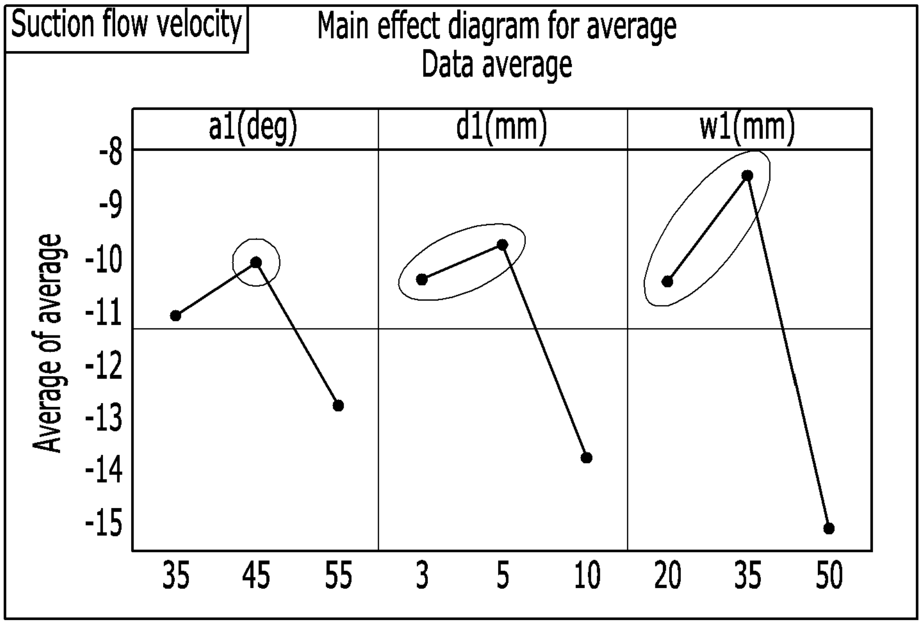

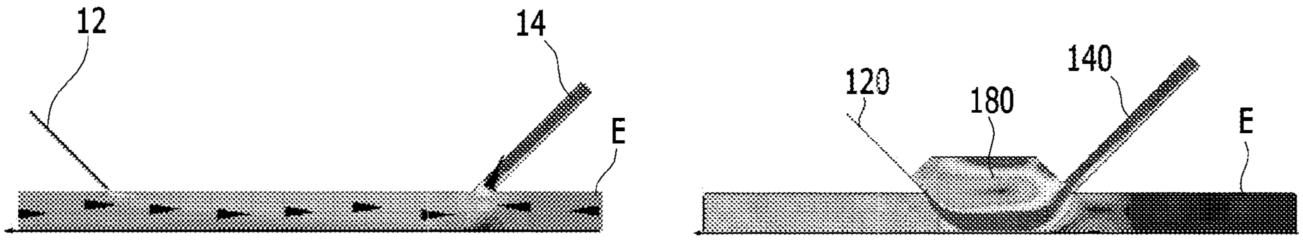
(a) (b)
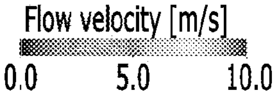
| Category | a1(deg) | d1(mm) | w1(mm) | Electrode surface flow velocity (m/s) | WSS(Pa) |
|---|---|---|---|---|---|
| (a) | 45 | 0 | 50 | 1.57 | 0.11 |
| (b) | 45 | 5 | 20 | 14.38 | 2.28 |
【FIG. 10】

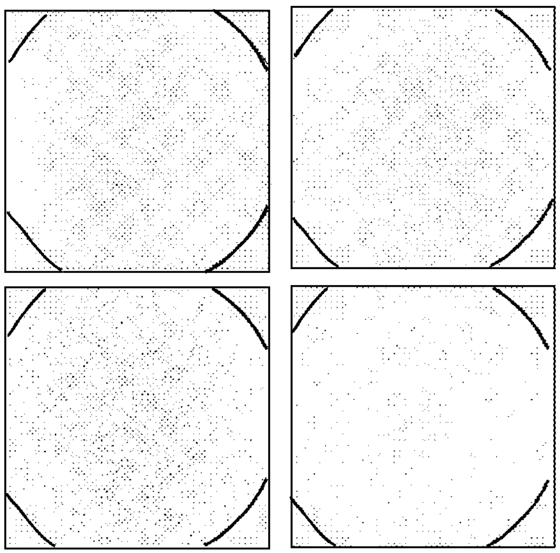
| Category | Number of foreign matter(ea) | | Removal rate(%) | |
|---|---|---|---|---|
| | Before | After | each | avg |
| (a) | 13,381 | 13,361 | 0.1% | 1.9% |
| | 13,130 | 12,920 | 1.6% | |
| | 9,939 | 9,739 | 2.0% | |
| | 10,629 | 10,152 | 4.5% | |
| | 16,967 | 16,745 | 1.3% | |
| (b) | 14,552 | 480 | 96.7% | 97.6% |
| | 15,404 | 279 | 98.2% | |
| | 15,781 | 259 | 98.4% | |
| | 13,775 | 412 | 97.0% | |
| | 14,012 | 341 | 97.6% | |
【FIG. 11】

FOREIGN MATTER REMOVAL DEVICE

CROSS-REFERENCE TO RELATED APPLICATIONS

This application is a national stage entry under 35 U.S.C. § 371 of International Application No. PCT/KR2022/013234, filed on Sep. 2, 2022, which claims priority to Korean Patent Application No. 10-2021-0117897, filed on Sep. 3, 2021, and Korean Patent Application No. 10-2022-0111454, filed on Sep. 2, 2022, the disclosures of which are hereby incorporated herein by reference in their entireties.

TECHNICAL FIELD

The present disclosure relates to a foreign matter removal device, and more particularly to a foreign matter removal device that removes foreign matters on the electrode surface in the production process of a battery.

BACKGROUND

Along with the technology development and increased demand for mobile devices, the demand for batteries as energy sources is increasing rapidly. In particular, a secondary battery has attracted considerable attention as an energy source for power-driven devices, such as an electric bicycle, an electric vehicle, and a hybrid electric vehicle, as well as an energy source for mobile devices, such as a mobile phone, a digital camera, a laptop computer and a wearable device.

The secondary battery may be classified based on the shape of a battery case into a cylindrical or prismatic battery wherein an electrode assembly having a structure in which a cathode, an anode, and a separator interposed between the cathode and the anode are stacked, is built in a cylindrical or prismatic metal can, and a pouch-type battery in which the electrode assembly is built in a pouch-shaped case made of a laminated aluminum sheet.

Further, the secondary battery may be classified based on the structure of an electrode assembly having a structure in which a cathode and an anode are stacked with a separator being interposed between the cathode and the anode. Typically, there may be mentioned a jelly-roll (wound) type structure in which long sheet type cathodes and long sheet type anodes are rolled with a separator being interposed between the cathode and the anode, a stacked (laminated) type structure in which pluralities of cathodes and anodes, cut into predetermined unit sizes, are sequentially stacked with separators being interposed between the cathodes and the anodes, or the like. In recent years, in order to solve problems caused by the jelly-roll type electrode assembly and the stacked type electrode assembly, there has been developed a stacked/folded type electrode assembly, which is a combination of the jelly-roll type electrode assembly and the stacked type electrode assembly.

Such electrode assemblies may generally be combined or produced via semi-automated or automated production lines. For example, the electrode, separator or the like constituting the electrode assembly is transferred along a guide member such as a rail or a rotating roll to a device that performs processing such as cuttings, adhesion, lamination and rolling, and can be combined or produced in the form of an electrode assembly through the operation of the above devices.

However, throughout the above-mentioned production process, foreign matters such as electrode powder or metal powder derived from the current collector are generated. These foreign matters fall on the surface of the electrode, in the process of transferring via rails, rotating rolls or the like between operations, or in the process of processing such as cutting, adhesion, lamination and rolling, which causes a problem that the voltage characteristics of the finished battery are deteriorated.

FIG. 1 is a cross-sectional view showing a conventional foreign matter removal device.

Referring to FIG. 1, the foreign matter removal device 10 includes a blowing unit 12 that blows air toward the surface of the electrode E moving along the transport direction p1, and a suction unit 14 that sucks foreign matters separated from the electrode surface, through which foreign matters on the surface of the electrode E are removed.

However, in the conventional foreign matter removal device 10, the air blown from the blowing unit 12 tends to be concentrated on the lower surface of the extension unit 16 between the blowing unit 12 and the suction unit 14 rather than the electrode E, due to the Coanda effect, which causes a problem that the foreign matter removal efficiency is lowered. Furthermore, if the flow rate/flow velocity is increased to solve these problems, the air consumption increased and the noise was generated.

DETAILED DESCRIPTION OF THE INVENTION

Technical Problem

The present disclosure has been designed to solve the above-mentioned problems, and an object of the present disclosure is to provide a foreign matter removal device that can improve the foreign matter removal efficiency and minimize the product defect rate by concentrating the blown air on the surface of an electrode.

The objects of the present disclosure are not limited to the aforementioned objects, and other objects which are not described herein should be clearly understood by those skilled in the art from the following detailed description and the accompanying drawings.

Technical Solution

According to an embodiment of the present disclosure, there is provided a foreign matter removal device for removing foreign matters on the surface of an electrode that is continuously transferred along one direction, the device comprising: a blowing unit that blows air toward the electrode surface, a suction unit that sucks foreign matters separated from the electrode surface, and an extension unit extending between the blowing unit and the suction unit, wherein the extension unit is formed with an adjustment unit recessed in a direction away from the electrode surface.

The blowing unit and the suction unit are formed of a slit forming an angle with the transfer direction of the electrode, the air blown from the blowing unit moves toward a direction opposite to the transfer direction of the electrode, and the air sucked by the suction unit may move in the same direction as the moving direction of the blown air.

An acute angle that the blowing unit makes with the transport direction of the electrode may have a value substantially equal to an acute angle that the suction unit makes with the transport direction of the electrode. The angle at which the air may be blown to the blowing unit forms 35 degrees to 55 degrees with the transfer direction of the electrode.

The blowing unit is formed of a slit forming an angle with the transfer direction of the electrode, and a width of the slit may be 0.03 mm to 0.07 mm.

The blowing unit is formed of a slit forming an angle with the transfer direction of the electrode, a protrusion protruding toward the flow space of the air is located at the end of the blowing unit, and the flow space may refer to a space formed above the electrode surface.

The protrusion forms an angle with the transport direction of the electrode, and an angle at which the protrusion makes with the transfer direction of the electrode may correspond to an angle at which the blowing unit makes with the transfer direction of the electrode.

A protrusion length of the protrusion may be 2 mm to 3 mm.

The angle at which the suction unit sucks foreign matters may be 35 degrees to 55 degrees.

The suction unit is formed of a slit forming an angle with the transfer direction of the electrode, and the width of the slit may be 1.0 mm to 3.0 mm.

The length of the extension unit may be 20 mm to 35 mm.

A depth of the adjustment unit is 3 mm to 5 mm, and the depth of the adjustment unit may be calculated based on one surface of the extension unit on which the adjustment unit is not formed.

BRIEF DESCRIPTION OF THE DRAWINGS

FIG. 1 is a cross-sectional view showing a conventional foreign matter removal device;

FIG. 2 is a cross-sectional view of a foreign matter removal device according to an embodiment of the present disclosure;

FIG. 3 is an experimental result for optimizing the protrusion of the foreign matter removal device according to FIG. 2;

FIGS. 4 and 5 are an optimization experiment design and results of the foreign matter removal device according to FIG. 2;

FIGS. 6 to 9 are graphs analyzing the experimental results of FIGS. 4 and 5;

FIG. 10 shows a comparison of experimental results of the conventional foreign matter removal device and the foreign matter removal device according to an embodiment of the present disclosure; and FIG. 11 shows a comparison of the foreign matter removal rate of the conventional foreign matter removal device and the foreign matter removal device according to an embodiment of the present disclosure.

DETAILED DESCRIPTION OF THE EMBODIMENTS

Hereinafter, various embodiments of the present disclosure will be described in detail with reference to the accompanying drawings so that those skilled in the art can easily carry out them. The present disclosure may be modified in various different ways, and is not limited to the embodiments set forth herein.

Portions that are irrelevant to the description will be omitted to clearly describe the present disclosure, and like reference numerals designate like elements throughout the description.

Further, in the drawings, the size and thickness of each element are arbitrarily illustrated for convenience of description, and the present disclosure is not necessarily limited to those illustrated in the drawings. In the drawings, the thickness of layers, regions, etc. are exaggerated for clarity. In the drawings, for convenience of description, the thicknesses of some layers and regions are exaggeratedly shown.

In addition, it will be understood that when an element such as a layer, film, region, or plate is referred to as being "on" or "above" another element, it can be directly on the other element or intervening elements may also be present. In contrast, when an element is referred to as being "directly on" another element, it means that other intervening elements are not present. Further, the word "on" or "above" means arranged on or below a reference portion, and does not necessarily mean being arranged on the upper end of the reference portion toward the opposite direction of gravity. Meanwhile, similar to the case where it is described as being located "on" or "above" another part, the case where it is described as being located "below" or "under" another part will also be understood with reference to the above-mentioned contents.

Further, throughout the description, when a part is referred to as "including" or "comprising" a certain component, it means that the part can further include other components, without excluding the other components, unless otherwise stated.

Further, throughout the description, when referred to as "planar", it means when a target portion is viewed from the upper side, and when referred to as "cross-sectional", it means when a target portion is viewed from the side of a cross section cut vertically.

Now, a foreign matter removal device according to an embodiment of the present disclosure will be described.

The foreign matter removal device 100 described below is described focusing on that it is used to remove foreign matters on the surface of the electrode E in the production process of the secondary battery. However, this is not necessarily the case, and it is obvious that the device can be used in various processes that require removal of foreign matters on the surface in addition to the production process of the secondary battery.

FIG. 2 is a cross-sectional view of a foreign matter removal device according to an embodiment of the present disclosure.

Referring to FIG. 2, the foreign matter removal device 100 according to an embodiment of the present disclosure has two body parts 110 symmetrical about the electrode E that crosses the center of the foreign matter removal device 100.

Meanwhile, in describing the present embodiment, the main body part 110 located on the upper part of the electrode E will be mainly described below, but it will be clarified in advance that these descriptions can also be applied to the main body part 110 located on the lower part of the electrode E.

The foreign matter removal device 100 includes a blowing unit 120 that blows air toward the surface of the electrode E moving along the transport direction p1 between the two main body parts 110, a suction unit 140 that sucks foreign matters separated from the electrode surface, and an extension unit 160 extending between the blowing unit 120 and the suction unit 140, wherein the extension portion 160 is formed with an adjustment unit 180 having a recessed shape.

The electrode E may be an object of the foreign material removal device 100. The electrode E may be provided in the form of a rectangular sheet in which the electrode slurry is applied to the current collector. The current collector that can be used here includes stainless steel, aluminum, copper, nickel, titanium, calcined carbon, or the like, and may be provided in various forms, such as a film, a sheet, a foil, a net, a porous body, a foam, and a nonwoven fabric. In addition, the electrode slurry may usually include an electrode active material, a conductive material, a binder, and a solvent, but is not limited thereto.

The electrode E may be moved in one direction by the rotational force of a roller that winds or unwinds the electrode. The electrode E may be continuously moved by the rotational force of a roller that winds or unwinds the electrode. The roller allows the electrode E to move between the two main body parts 110 inside the foreign matter removal device 100.

The blowing unit 120 can be configured to blow air to remove foreign matters attached to the surface of the electrode E. The blowing unit 120 may be located farther from the place where the electrode E inflows to pass through the foreign matter removal device 100 so that it faces the electrode E later than the suction unit 140 on the basis of the transport direction p1 of the electrode E in the foreign matter removal device 100.

The blowing unit 120 may be formed in a slit shape in the main body part 110. The flow rate and flow velocity of the air injected from the blowing unit 120 may be determined according to the width of the slit of the blowing unit 120. The width of the slit of the blowing unit 120 according to the present embodiment may be smaller than the width of the slit of a normal blowing unit 120. The width of the slit of the blowing unit 120 may be less than 0.5 mm. In addition, the width of the slit of the blowing unit 120 may be 0.1 mm or less, 0.07 mm or less, and 0.01 mm or more, 0.03 mm or more. In detail, the error range may be 0.05 mm or less of 0.005 mm. This is to maximize the flow velocity at the same flow rate by making the width of the slit smaller than in the prior art.

The blow angle a1 of the air discharged by the blowing unit 120 may form an angle with the transfer direction p1 of the electrode E. The blow angle a1 may be determined according to the shape of the slit of the blowing unit 120. Here, the blow angle a1 may refer to an acute angle among the angles formed by the transport direction p1 of the electrode E and the air jetting path.

Specifically, the blowing unit 120 may be formed into an oblique line toward the surface of the electrode E inside the main body part 110. The blowing unit 120 may be formed in an oblique line so that the air outflowing from the blowing unit 120 moves in a direction opposite to the transfer direction p1 of the electrode. Since the pressure applied to the surface of the electrode E by the air ejected from the blowing unit 120 may be different depending on the blow angle a1 of the blowing unit 120, the blow angle a1 of the blowing unit 120 may have to be appropriately designed. A detailed description of the blow angle a1 will be described later through experimental data.

A protrusion 122 may be formed at the end of the blowing unit 120. The protrusion 122 may refer to a portion that extends from the blowing unit 120 and protrudes into the air flow space. Here, the 'flow space' means a space formed on the upper part of the surface of the electrode E, and may mean a space formed between the present foreign matter removal device 100 and the surface of the electrode E. Here, the 'flow space' may be formed larger by the adjustment unit 180, wherein the 'flow space' may refer to a space between the surface of the recessed adjustment unit 180 and the surface of the electrode E.

The protrusion 122 may be located at the end in the travelling direction of the air discharged from the blowing unit 120, thereby adjusting the flow direction of the blown air. The flow direction of the air may vary depending on the angle of the protrusion 122. Here, the angle of the protrusion 122 may correspond to the blow angle a1 of the blowing unit 120. However, it would also be possible to design the blow angle a1 to be smaller or larger, depending on the intentions of the designer. Further, the flow direction of the air may vary depending on the size of the protrusion 122. Depending on the degree to which the protrusion 122 protrudes into the air flow space, the effect of the protrusion 122 on the air may vary.

The suction unit 140 may be configured to suck foreign matters separated from the surface of the electrode E by the blowing unit 120 and remove them. The suction unit 140 may be located close to a place where the electrode E inflows to pass through a portion of the foreign matter removal device 100 so as to meet the electrode E before the blowing unit 120 based on the transport direction p1 in the foreign matter removal device 100.

The suction unit 140 may be formed in a slit shape in the main body part 110. The flow rate and flow velocity of the air sucked in by the suction unit 140 may be determined according to the width of the slit of the suction unit 140. It may be preferable that the suction unit 140 has a larger slit width than that of the blowing unit 120 in terms of its function. The width of the slit of the suction unit 140 may be 1.0 to 3.0 mm, and specifically, it may be 2.0 mm within an error range of 0.2 mm or less.

An angle at which the suction unit 140 sucks air may form an angle with the transport direction p1 of the electrode E. Specifically, the suction unit 140 may be formed into an oblique line from the surface of the electrode E toward the inside of the main body part 110. The suction unit 140 may be formed into an oblique line so that the sucked air is directed from the front to the rear with respect to the transport direction p1 of the electrode. The blow angle of the suction unit 140 may have to be appropriately designed. For example, the jetting angle of the suction unit 140 may be 35 to 55 degrees, which may mean an acute angle formed with the transport direction p1 of the electrode E.

Meanwhile, in the blowing unit 120 and the suction unit 140, the end of the blowing unit 120 and the end of the suction unit 140 may be located toward each other. This may be for the suction unit 140 to effectively collect the air ejected from the blowing unit 120. Here, the end may refer to a portion located closest to the electrode E in the blowing unit 120 and the suction unit 140.

The extension unit 160 may refer to a portion extending from the blowing unit 120 to the suction unit 140. The air blown from the blowing unit 120 may flow in the space between the extension unit 160 and the electrode E, and then may be sucked by the suction unit 140.

Since the length w1 of the extension unit 160 determines the air flow space, it may affect the foreign matter removal efficiency. The length w1 of the extension unit 160 may be set differently depending on the flow rate and flow velocity of the air discharged from the blowing unit 120, the suction power of the suction unit 140, and the like. Here, the length w1 of the extension unit 160 means the length between the end of the blowing unit 120 and the suction unit 140, and when the protrusion 122 is formed at the end of the blowing unit 120, the length w1 of the extension unit 160 may mean a length from the end of the protrusion 122 to the suction unit 140. Further, the length w1 of the extension unit 160 may be calculated based on a straight line parallel to the transport direction p1. A detailed description of the length w1 of the extension unit 160 for improving the effect of removing foreign matters will be given later through experimental data.

The adjustment unit 180 may be a portion that adjusts the airflow of the air injected from the blowing unit 120. The adjustment unit 180 may be formed in the extension unit 160. The adjustment unit 180 may also be referred to as an "airflow adjustment unit" or the like. The adjustment unit 180 may be for concentrating the air blown from the blowing unit 120 on the surface of the electrode E. The adjustment unit 180 may be for minimizing the Coanda effect.

The adjustment unit 180 may have a shape that is recessed in a direction away from the surface of the electrode E. The adjustment unit 180 may have a shape that is recessed in a direction away from the surface of the electrode E. The adjustment unit 180 may be a portion that have been removed from the extension unit 160 to expand the air flow space. A space in which the air blown on the surface of the electrode E flows may be formed widely between the blowing unit 120 and the suction unit 140 through the adjustment unit 180. The adjustment unit 180 can be formed, thereby expanding the air flow space.

The degree to which the adjustment unit 180 is recessed may be represented by the maximum value of the depth or height of the adjustment unit 180 calculated based on one surface of the extension unit 160 before the adjustment unit 180 is formed. The depth d1 of the adjustment unit 180 may be set differently depending on the length w1 of the extension unit 160, the flow rate and flow velocity of air discharged from the blowing unit 120, the suction power of the suction unit 140, and the like. A detailed description of the depth d1 of the adjustment unit 180 for improving the effect of removing foreign matters will be given later through experimental data.

An experimental design and its results for optimizing the foreign matter removal device 100 according to an embodiment of the present disclosure will be described below.

FIG. 3 is an experimental result for optimizing the protrusion of the foreign matter removal device according to FIG. 2.

Referring to FIG. 3, the blowing unit 120 is provided in the form of a slit formed in the main body part 110, wherein the effect of the protrusion 122 of the blowing unit 120 may vary depending on the shape of the corner 162 of the extension unit 160.

FIG. 3(*a*) Case 1 may be a case in which the adjustment unit 180 is not formed in the foreign matter removal device 100. Referring to FIG. 3(*a*), the air discharged from the blowing unit 120 exhibits the fastest flow velocity around the extension unit 160, and exhibits a low flow velocity around the electrode E. When the adjustment unit 180 is not formed in the foreign matter removal device 100 in this way, it may be difficult to form a large flow rate/flow velocity of the gas passing around the electrode E, which may reduce the foreign matter removal efficiency.

FIG. 3(*b*) Case 2 may be a case in which the adjustment unit 180 is formed in the foreign matter removal device 100, and the corner 162 has a symmetrical shape with the protrusion 122. That is, this may be in a state in which the protrusion 122 does not protrude into the air flow space. This may be referred to as a case in which the protrusion 122 is not formed. Referring to FIG. 3(*b*), it was confirmed that the flow velocity of the air discharged from the blowing unit 120 in the vicinity of the extension unit 160 is slightly lower than in the case of FIG. 3(*a*), but the flow velocity around the electrode E cannot be improved.

FIG. 3(*c*) Case 3 may be a case where the adjustment unit 180 is formed in the foreign matter removal device 100, and a part of the end of the corner 162 is removed so that a part of the protrusion 122 protrudes into the air flow space. Referring to FIG. 3(*c*), a phenomenon in which the air discharged from the blowing unit 120 rather outflows to the left is shown, so that the effect of improving the flow velocity around the electrode (E) did not appear.

FIG. 3(*d*) Case 4 may be a case where the adjustment unit 180 is formed in the foreign matter removal device 100, and the end of the corner 162 is removed according to the recessed shape of the adjustment unit 180, so that the protrusion 122 protrudes into the air flow space. Referring to FIG. 3(*d*), it can be confirmed that the air discharged from the blowing unit 120 is concentrated in the lower direction, so that the flow velocity around the electrode (E) is improved than the flow velocity around the extension unit 160 or the adjustment unit 180. That is, since the size of the protrusion 122 is sufficiently large, it appears that the air emitted from the blowing unit 120 concentrates around the electrode E.

Referring to the results in FIG. 3 in this way, the corner 162 on the outermost side of the extension unit 160 may be preferably removed according to the shape of the adjustment unit 180. By removing the corner 162 of the extension unit 160, the protrusion 122 may be located in a state protruding toward the flow space, whereby the protrusion 122 may participate in the flow direction of the air. Further, it may be preferable that the size of the protrusion 122 is sufficiently large.

FIGS. 4 and 5 are an optimization experiment design and results of the foreign matter removal device according to FIG. 2. In FIGS. 4 and 5, WSS is an abbreviation for wall shear stress, which means the stress generated on the corresponding surface, and left outflow refers to a phenomenon in which air outflows in the opposite direction rather than in the designed direction.

Referring to FIGS. 4 and 5, a DOE experiment design of a three-factor three level was performed to derive the optimal condition of the foreign matter removal device 100, and the result of performing an experiment for nine conditions by CFD can be confirmed. Refer to Table below for the basic conditions and experimental factors and levels of the experiment. When the above experiment is conducted, the moving speed of the electrode was 110 m/min, and the protrusion 122 was formed in the form of FIG. 3(*d*). Meanwhile, in the following tables and descriptions, it should be clarified in advance that blowing (blow) is related to the blowing unit 120 and suction is related to the suction unit 140.

TABLE 1

| Slit size(mm) | | slit flow velocity (m/s) | | Suction | | Blow slit(mm) | |
|---|---|---|---|---|---|---|---|
| Blowing | suction | blowing | suction | angle (deg) | h1 (mm) | Protrusion length | R value |
| 0.05 | 2.0 | 100 | 15 or less | 45 | 5 | 3.0 | 0.2 |

TABLE 2

| Experiment factor/level | a1(deg) | d1(mm) | w1(mm) |
|---|---|---|---|
| 1 | 45 | 3 | 50 |
| 2 | 35 | 5 | 35 |
| 3 | 55 | 10 | 20 |

FIGS. 6 to 9 are graphs analyzing the experimental results of FIGS. 4 and 5.

Referring to FIGS. 6 to 9 and Table below, to derive the optimal conditions for the foreign matter removal device 100, the DOE analysis result obtained by analyzing the experimental result can be confirmed.

Tables 3 to 6 are tables obtained by performing Taguchi analysis on four variables: electrode surface flow velocity, WSS, left outflow, and suction flow velocity. Table 7 is a table in which the main factors are selected mainly based on the occupation rate values shown in Tables 3 to 6 as a result of the analysis through the above-mentioned Tables and Figures.

Further, FIGS. 6 to 9 show main effect diagrams for each variable.

TABLE 3

| Characteristic | Level | a1(deg) | d1(mm) | w1(mm) |
|---|---|---|---|---|
| Electrode surface flow velocity | 1 | 12.24 | 13.29 | 14.01 |
| | 2 | 15.31 | 14.66 | 13.40 |
| | 3 | 14.73 | 14.32 | 14.86 |
| | Delta | 3.07 | 1.37 | 1.46 |
| | Occupation rate | 52% | 23% | 25% |

TABLE 4

| Characteristic | level | a1(deg) | d1(mm) | w1(mm) |
|---|---|---|---|---|
| WSS | 1 | 2.23 | 2.65 | 2.23 |
| | 2 | 3.17 | 3.03 | 3.01 |
| | 3 | 3.40 | 3.11 | 3.55 |
| | Delta | 1.17 | 0.47 | 1.32 |
| | Occupation rate | 39% | 16% | 45% |

TABLE 5

| Characteristic | level | a1(deg) | d1(mm) | w1(mm) |
|---|---|---|---|---|
| Left outflow | 1 | 1.35 | 1.04 | 2.94 |
| | 2 | 0.98 | 0.89 | −0.14 |
| | 3 | −0.34 | 0.06 | −0.80 |
| | Delta | 1.69 | 0.97 | 3.74 |
| | Occupation rate | 26% | 15% | 58% |

TABLE 6

| Characteristic | level | a1(deg) | d1(mm) | w1(mm) |
|---|---|---|---|---|
| Suction flow velocity | 1 | −11.00 | −10.33 | −10.33 |
| | 2 | −10.00 | −9.67 | −8.33 |
| | 3 | −12.67 | −13.67 | −15.00 |
| | Delta | 2.67 | 4.00 | 6.67 |
| | Occupation rate | 20% | 30% | 50% |

TABLE 7

| Characteristic | a1(deg) | d1(mm) | w1(mm) |
|---|---|---|---|
| Electrode surface flow velocity | ◎ | ○ | ○ |
| WSS | ◎ | ○ | ◎ |
| Left outflow | ○ | Δ | ◎ |
| Suction flow velocity | ○ | ○ | ◎ |

◎Upper
○Middle
ΔLower

When referring to Tables 3 to 7, it was shown that the blow angle a1 of the blowing unit 120 has a large effect on the electrode surface flow velocity and WSS, and the length w1 of the extension unit 160 has a great influence on all of the WSS, the left outflow, and the suction flow velocity. In addition, it was found that the depth d1 of the adjustment unit 180 is not significantly involved in the left air outflow.

Referring to FIGS. 6 and 8, when the blow angle (a1) of the blowing unit 120 and the depth (d1) of the adjustment unit 180 deviates from a certain level, the outflow generated, the electrode surface flow velocity value showed a tendency to decrease. When referring to FIG. 8, which can confirm the presence or absence of left outflow, it may be desirable to preferentially exclude the outflow data values from the optimal condition. Further, referring to FIG. 7, when the depth d1 value of the adjustment unit 180 is around 5 mm, it appears that the WSS value fluctuates greatly, which is presumed to be because the separation distance h1 between the main body part 110 and the electrode E is designed to be 5 mm. Further, as shown in FIG. 9, when the blow angle (a1) of the blowing unit 120 is 45 degrees within the error range of 0.5 degrees, the depth (d1) value of the adjustment unit 180 is 3 to 5 mm, more specifically, 5 mm within an error range of 0.2 mm, and the length (w1) value of the extension unit 160 is 20 to 35 mm, more specifically 20 mm within the error range of within 0.2 mm, it was found to be advantageous in terms of suction consumption.

Table 8, which will be described below, is an optimal condition derived by synthesizing the above-described results. Specifically, the blow angle a1 of the blowing unit 120, the length w1 of the extension unit 160, and the depth d1 of the adjustment unit 180 according to each characteristic were based on the values shown in FIGS. 6 to 9. Further, the optimal condition value was selected based on the main factor results in each Table 7.

TABLE 8

| No. | Characteristic | a1(deg) | d1(mm) | w1(mm) |
|---|---|---|---|---|
| 1 | Electrode surface flow velocity | 45/55 | 5/10 | 50 |
| 2 | WSS | 55/45 | 10/5 | 50 |
| 3 | Left outflow | 35/45 | 3/5 | 20 |
| 4 | Suction flow velocity | 45 | 5/3 | 35/20 |
| Optimum condition | | 45 | 5 | 20 |

FIG. 10 shows a comparison of experimental results of the conventional foreign matter removal device and the foreign matter removal device according to an embodiment of the present disclosure.

For clearer comparison, FIG. 10 compares the CFD simulation results of the foreign matter removal device 100 of the present embodiment and the results of the conventional foreign material removal device 10 in which the control part 180 is not formed. Here, the foreign matter removal device 100 of the present embodiment reflects the optimum conditions of Table 8 derived through the above-mentioned experiment.

In the present experiment of FIG. 10(*a*) and FIG. 10(*b*), the slit width of the blowing unit 12 and the blowing unit 120 was different, but the flow velocity of the air blown therefrom was the same (change the flow velocity of the blown air), the slit angle of the suction unit 140 was 45 degrees, and the flow velocity of suction was the minimum flow rate at which no air outflow generated. In addition, when the experiment was performed, the moving speed of the electrode was 110 m/min, and the separation distance h1 between the main body part 110 and the electrode E was 5 mm. Refers to Table 9 below for other conditions of this experiment.

TABLE 9

| Case | Slit size(mm) | | Slit flow velocity (m/s) | a1 (deg) | d1 | w1 | Blow slit(mm) | |
|---|---|---|---|---|---|---|---|---|
| | blowing | suction | blowing | blowing | (mm) | (mm) | Protrusion length | R value |
| FIG. 10 (a) | 0.5 | 2.0 | 10 | 45 | | 50 | | |
| FIG. 10 (b) | 0.05 | 2.0 | 100 | 45 | 5 | 20 | 3.0 | 0.2 |

Referring to FIG. 10, it can be confirmed that in the foreign matter removal device 100 of the present embodiment to which the optimum condition of FIG. 10(*b*) is applied, the flow velocity around the surface of the electrode E is improved by 800%, as compared with the conventional foreign material removal device 100 of FIG. 10(*a*). From these results, it can be confirmed that the foreign matter removal device 100 of the present embodiment can remove the foreign matters attached to the surface of the electrode E more efficiently than the conventional device.

FIG. 11 shows a comparison of the foreign matter removal rate of the conventional foreign matter removal device and the foreign matter removal device according to an embodiment of the present disclosure.

For clearer comparison, FIG. 11 shows the results of the foreign matter removal device 100 of the present embodiment and the conventional foreign matter removal device 10 together. Here, the optimal conditions of Table 8 derived through the above-mentioned experiment were reflected in the foreign matter removal device 100 of the present embodiment.

In the present experiment, the suction flow velocity was the minimum flow velocity value at which no outflow of air generated, and the flow rate of the blowing unit 120 was 77 LPM. In addition, the separation distance h1 between the main body part 110 and the electrode E was 5 mm. For evaluation conditions and procedures of this experiment, refer to Table 10 below.

TABLE 10

| No. | Evaluation procedure | Tool | Details |
|---|---|---|---|
| 1 | Select foreign matter | — | Type SUS304L, size 50 μm |
| 2 | Input foreign matter | Particle Trap, Tweezer | Foreign matter about 10,000~17,000 ea/Trap, 5 times each |
| 3 | Set foreign matter removal condition | Flow meter | Select the same flow rate (77 LPM) |
| 4 | Inspect before removal | JOMESA microscope | Auto measurement |
| 5 | Remove foreign matter | foreign matter removal device | Use devices that reflect conventional and optimal conditions |
| 6 | Inspect after removal | JOMESA microscope | Auto measurement |

Referring to FIG. 11, it can be confirmed that in the foreign matter removal device 100 of the present embodiment to which the optimum condition is applied, the foreign matter removal rate is improved by about 5000%, as compared with the conventional foreign matter removal device 100. As shown in the results of FIG. 10, this may be because the adjustment unit 180 is formed in the foreign matter removal device 100 and the numerical values of each component are appropriately adjusted, so that the air blowing from the blowing unit 120 sufficiently collides with the surface of the electrode E to separate foreign matters.

The above description is merely illustrative of the technical idea of the present disclosure, and those skilled in the art will appreciate that various modifications and variations can be made without departing from the essential characteristics of the present disclosure. Accordingly, the embodiments of the present disclosure described above can be carried out separately or in combination with each other.

The embodiments disclosed herein are provided for explaining rather than limiting the technical idea of the present disclosure, and the scope of the technical idea of the present disclosure is not limited by these embodiments. Therefore, the protection scope of the present disclosure should be construed by the following claims, and all technical ideas within the equivalent scope thereof should be construed as being included in the scope of the present disclosure.

DESCRIPTION OF REFERENCE NUMERALS

100: foreign matter removal device
110: main body part
120: blowing unit
122: protrusion
140: suction unit
160: extension unit
180: adjustment unit

INDUSTRIAL APPLICABILITY

According to embodiments, the foreign matter removal device of the present disclosure allows the blown air to be concentrated on the surface of an electrode, thereby improving the foreign material removal rate, reducing the product defect rate due to foreign matters on the electrode surface, and enhancing the product uniformity or reliability.

The effects of the present disclosure are not limited to the effects mentioned above and additional other effects not described above will be clearly understood from the detailed description and the appended drawings by those skilled in the art.

The invention claimed is:

1. A foreign matter removal device for removing foreign matter on a surface of an electrode that is continuously transferred along a transfer direction, the device comprising:

a guide member configured to transfer the electrode along the transfer direction, a blowing unit that is configured to blow air toward the surface of the electrode, a suction unit that is configured to suck foreign matter separated from the surface of the electrode, and an extension unit extending between the blowing unit and the suction unit, wherein the extension unit comprises an adjustment unit recessed in a recess direction away from the guide member, the recess direction being perpendicular to the transfer direction, wherein the blowing unit comprises a slit forming an angle relative to the transfer direction, the blowing unit has a protrusion protruding toward a flow space located at an end of the blowing unit, and the flow space is a space formed within the adjustment unit recessed in the recess direction away from the guide member.

2. The foreign matter removal device according to claim 1, wherein the blowing unit and the suction unit each comprise a slit forming an angle relative to the transfer direction, the foreign matter removal device is configured such that the air blown from the blowing unit moves in an air travel direction opposite to the transfer direction, and the foreign matter removal device is configured such that the air sucked by the suction unit moves in the air travel direction.

3. The foreign matter removal device according to claim 2, wherein the angle of the blowing unit relative to the transfer direction is a first acute angle that has a value substantially equal to the angle of the suction unit relative to the transfer direction that is a second acute angle.

4. The foreign matter removal device according to claim 1, wherein the blowing unit is configured to blow the air at an angle of 35 degrees to 55 degrees relative to the transfer direction.

5. The foreign matter removal device according to claim 1, wherein the blowing unit comprises a slit forming an angle relative to the transfer direction, and a width of the slit is 0.03 mm to 0.07 mm.

6. The foreign matter removal device according to claim 1, wherein the protrusion forms a protrusion angle relative to the transport direction, and the protrusion angle has a value substantially equal to a first angle of the blowing unit relative to the transfer direction.

7. The foreign matter removal device according to claim 1, wherein the protrusion has a length of 2 mm to 3 mm.

8. The foreign matter removal device according to claim 1, wherein the suction unit is configured to suck the foreign matter at an angle of 35 degrees to 55 degrees.

9. The foreign matter removal device according to claim 1, wherein the suction unit comprises a slit forming an angle relative to the transfer direction, and the width of the slit is 1.0 mm to 3.0 mm.

10. The foreign matter removal device according to claim 1, wherein the extension unit has a length of 20 mm to 35 mm.

11. The foreign matter removal device according to claim 1, wherein the adjustment unit has a depth of 3 mm to 5 mm, and the depth of the adjustment unit is a distance between a first surface of the extension unit on which the adjustment unit is not formed and a second surface of the extension unit within the adjustment unit that is farthest from the first surface in the recess direction.

* * * * *